(12) United States Patent
Nemenman et al.

(10) Patent No.: US 12,261,445 B2
(45) Date of Patent: *Mar. 25, 2025

(54) OPTIMIZER FOR SOLAR STRING POWER GENERATION SYSTEMS AND A METHOD THEREOF

(71) Applicant: VIGDU V TECHNOLOGIES LTD, Netanya (IL)

(72) Inventors: Ilya Nemenman, Modi 'in Makabim-Re 'ut (IL); Shlomo Adler, Jerusalem, IL (US); Evsei Berman, Netanya (IL)

(73) Assignee: VIGDU V TECHNOLOGIES LTD, Netanya (IL)

( * ) Notice: Subject to any disclaimer, the term of this patent is extended or adjusted under 35 U.S.C. 154(b) by 84 days.

This patent is subject to a terminal disclaimer.

(21) Appl. No.: 18/121,866

(22) Filed: Mar. 15, 2023

(65) Prior Publication Data

US 2023/0216310 A1  Jul. 6, 2023

Related U.S. Application Data

(63) Continuation of application No. 17/295,517, filed as application No. PCT/IL2019/051230 on Nov. 11, 2019, now Pat. No. 11,621,564.

(30) Foreign Application Priority Data

Nov. 25, 2018  (IL) .......................................... 263276

(51) Int. Cl.
*H02J 3/38*   (2006.01)
*G05F 1/67*   (2006.01)
(Continued)

(52) U.S. Cl.
CPC ................ *H02J 3/381* (2013.01); *G05F 1/67* (2013.01); *H02J 3/46* (2013.01); *H02J 7/35* (2013.01); *H02J 2300/26* (2020.01); *H02S 40/32* (2014.12)

(58) Field of Classification Search
CPC ...... H02J 3/381; H02J 3/46; H02J 7/35; H02J 2300/26; G05F 1/67; H02S 40/32
See application file for complete search history.

(56) References Cited

U.S. PATENT DOCUMENTS

| 6,689,291 | B1 | 2/2004 | Reiffenrath et al. |
| 9,466,737 | B2 | 10/2016 | Ledenev |

(Continued)

FOREIGN PATENT DOCUMENTS

| CN | 104734603 A | 6/2015 |
| CN | 105958934 A | 9/2016 |

(Continued)

OTHER PUBLICATIONS

Texas Instruments, "Phase-Shifted Full Bridge DC/DC Power Converter Design Guide" Texas Instruments May 31, 2014 (TIDU248—May 2014) (pp. 1-56).

(Continued)

*Primary Examiner* — Carlos Amaya
(74) *Attorney, Agent, or Firm* — Millen, White, Zelano & Branigan P.C.; Wan-Ching Montfort

(57) ABSTRACT

The present invention relates to an optimizer, for a solar string power generation system, comprising an Injection Circuit (IC), connected to at least one string, from an array of strings of solar panels, wherein the output of said IC is connected to the DC bus of the solar inverter. The IC comprises: (i) an MPPT mechanism, for finding the MPP of the connected string; (ii) a DC/DC converter, for converting part of the power of said connected string; wherein the (Continued)

DC/DC converter, converts only a part of the power of the string, that is connected to the IC, when the string is impaired, for compensating for the relative voltage difference between the voltage MPP, of the impaired string, and the MPP voltage of the DC bus of the solar inverter and the array of strings.

17 Claims, 7 Drawing Sheets

(51) Int. Cl.
  *H02J 3/46* (2006.01)
  *H02J 7/35* (2006.01)
  *H02S 40/32* (2014.01)

(56) References Cited

U.S. PATENT DOCUMENTS

| | | |
|---|---|---|
| 10,032,939 B2 | 7/2018 | Ledenev et al. |
| 10,714,637 B2 | 7/2020 | Ledenev et al. |
| 11,326,102 B2 | 5/2022 | Manabe et al. |
| 11,621,564 B2 * | 4/2023 | Nemenman ............ H02J 7/35 307/78 |
| 2002/0166994 A1 | 11/2002 | Kondo et al. |
| 2010/0126550 A1 | 5/2010 | Foss |
| 2010/0288327 A1 | 11/2010 | Lisi et al. |
| 2013/0193765 A1 | 8/2013 | Yoscovich |
| 2015/0013744 A1 | 1/2015 | Kim et al. |
| 2015/0364918 A1 | 12/2015 | Singh et al. |
| 2016/0254672 A1 | 9/2016 | Yoscovich et al. |
| 2020/0385636 A1 | 12/2020 | Manabe et al. |

FOREIGN PATENT DOCUMENTS

| | | |
|---|---|---|
| DE | 4411806 B4 | 11/2013 |
| GB | 2513868 A | 11/2014 |
| WO | 2011049985 A1 | 4/2011 |
| WO | 2019048444 A1 | 3/2019 |

OTHER PUBLICATIONS

International Search Report dated Feb. 25, 2020 issued in corresponding PCT/IL2019/051230 application (4 pages).
English Abstract of CN 105958934 A published Sep. 21, 2016.
English Abstract of CN 104734603 A published Jun. 24, 2015.

* cited by examiner

OPTIMIZER FOR SOLAR STRING POWER GENERATION SYSTEMS AND A METHOD THEREOF

TECHNICAL FIELD

The present invention relates to solar power generation systems. More particularly, the present invention relates to a method and apparatus for optimizing the performance of solar string power generation systems.

BACKGROUND

As of today, Photovoltaic solar power generation systems, i.e. solar farms, are typically made up of solar panels comprising photovoltaic "cells". Photovoltaic cells are semiconductor devices that convert light into energy. When light shines on a panel, a voltage develops across the panel, and when connected to a load, current flows. The voltage and current vary with several factors, including the physical size of the panel, the panel efficiency, the amount of light shining on the panel, the temperature of the panel, and other factors.

Typically, a number of solar panels are connected in series, referred to as a "string", to create an increased output voltage. As a general rule, the higher the voltage—the less the energy loss, hence the higher the efficiency of the system. Thus, it is desirable to connect as much panels in series as possible in a string. However, the permitted maximum output voltage, of a single string, is typically limited by standards and state rules, due to the hazardous nature of a very high voltage. Thus, to generate substantial power at a minimum loss, photovoltaic power generation systems are typically comprised of many "high voltage" strings connected in parallel. These parallel-connected strings are referred to as "arrays".

Since the Solar cells generate DC power, while the electricity grid is typically AC power, an "inverter" has to be connected. An inverter may be connected to an array of many parallel-connected strings, for converting their DC power to AC power, for feeding the electricity grid or local consumers.

Many solar inverters contain Maximum Power Point Tracking (MPPT) circuitry for maximizing the power from the strings. These known-in-the-art MPPT circuits adjust the voltage (and the current) at which the arrays operate, measure their output power, and seek those voltage and current values at which power output is maximized. Thus, the MPPT of the array is typically done by the inverter.

Since Solar panels generate their maximum power at their maximum power point, it follows that arrays generate their maximum power when all panels comprising the array operate at their maximum power point. However, many interferences cause power loss to the panels, such as: shading, soiling, corrosion, manufacturing tolerance mismatch, breakage, micro-cracks, and aging. Thus, when a fraction of the panels in a string are impaired, the impaired panels do not generate as much power as the other, normally operating panels. The net effect, then, is that the voltage across that string drops. An example is set forth in FIG. 1: graph 10 exhibits the I-V curve, i.e. voltage and current characteristics, of an optimal string, where all its panels are operating optimally. Graph 12, on the other hand, exhibits the I-V curve of a nonoptimal, i.e. impaired, string that some of its panels are impaired. Due to the impaired panels, the Maximum Power Point (MPP), of the impaired string, of graph 12, is located at point 22 which has different I-V values than the MPP point 20 of the optimal string, of graph 10.

In this nonoptimal situation, the performance, of the array, is reduced in two ways: the first of which is simply that the impaired panels no longer generate their maximum power, the second is that they change the MPP of the whole array. Since the voltage value (X grid) of MPP 22, of the string that has the impaired panels, is actually lower, it affects the average MPP 21 of the whole array, as shown in graph 11 of FIG. 1. The MPPT circuit of the inverter may drive the whole array to work at the average point 21 which is not the MPP of any of the strings. Thus, the panels in the array are forced to operate away from their MPP values, which results in reduction of, the otherwise available, power of the array.

It is therefore desired to introduce inexpensive means to enable arrays to produce as much power as possible, by ensuring that as many panels as possible operate as close as possible to their MPP.

One approach to solve this problem is to equip each cell or small group of cells in a panel with a boost circuit that boosts the panel voltage as needed. This approach is very expensive because a separate boost circuit is needed for each cell or small group of cells.

Another approach is to equip each panel in a string with a boost circuit that boosts the panel voltage as needed. This approach is also relatively expensive because a separate boost circuit is needed for each panel.

Other solutions have an inverter that includes a separate MPPT circuit for each string or small number of strings connected to the inverter, known as "String Inverters". However, this architecture doesn't address high scale installations with several hundred or even thousands of strings in a large area since it is expensive, inflexible and causes significant recurring transmission losses.

US 20100126550 discloses an injection scheme. The disclosed injection circuit tunes the operating point of the string to keep it running at maximum power production if one or more cells in a string are impaired. Thus, a small amount of energy is injected into the string to keep the string as a whole operating at its maximum power point. If the voltage across one or more of the cells in the string drops, the circuit injects power to compensate, and enables the string to continue operating at its maximum power point. The source of power for the injection circuit is the DC bus to which the string is connected or an external power source. However, this solution does not allow stable output to a low voltage dropout, which is inefficient.

It would therefore be desired to propose a system void of these deficiencies.

SUMMARY

It is an object of the present invention to provide a method for maximizing the power from a Photovoltaic power station, that has impaired panels.

It is another object of the present invention to provide an apparatus for compensating the voltage, of an impaired string, on the expense of its current.

It is still another object of the present invention to provide a method for providing a reliable voltage production from the strings of an array, of a Photovoltaic power station, for accommodating a single MPPT multi-string inverter or large scale central inverter.

It is still another object of the present invention to provide a method and apparatus for handling power deficiencies, from impaired solar panels, that is energy efficient.

Other objects and advantages of the invention will become apparent as the description proceeds.

The present invention relates to an optimizer for solar string power generation system comprising: (a) an array of strings of solar panels where at least a part of said solar panels are connected in series in said strings, and wherein said strings are connected in parallel to form said array of strings of solar panels; (b) a DC bus, connected to said array of strings; (c) a solar inverter, connected, at its input, to said DC bus, for converting the solar DC power, from said array of strings, to AC power; (d) an Injection Circuit (IC), connected to at least one of said strings wherein the output of said IC is connected to said DC bus of said solar inverter and said array of strings, comprising: (i) an MPPT mechanism, for finding the MPP of said connected at least one string; (ii) a DC/DC converter, for converting at least a part of the power of said connected at least one string; and (iii) wherein said DC/DC converter, of said IC, converts only a part of the power of said at least one string, connected to said IC, when said at least one string is impaired, for compensating for the relative voltage difference between the voltage MPP, of said impaired string, and the MPP voltage of said DC bus of said solar inverter and said array of strings.

Preferably, the IC is a phase shift full bridge circuit.

In one embodiment, the phase shift full bridge circuit has bottom diodes.

In one embodiment, the phase shift full bridge circuit has bottom synchronous MOSFETS.

Preferably, the operation dynamic range of the input of said string optimizer is between 250V-1400V.

Preferably, the operation dynamic range of the delta output of said string optimizer is between 5V-250V.

The present invention also relates to a method for optimizing solar string power generation system comprising: (a) providing an array of strings of solar panels where at least part of said solar panels are connected in series in said strings, and wherein said strings are connected in parallel to form said array of strings of solar panels; and (b) providing a solar inverter, connected by a DC bus to said array of strings, for converting the solar DC power, from said array of strings, to AC power; (c) providing an IC, connected to the input of at least on of said strings, wherein the output of said IC is connected to said DC bus, of said solar inverter, which comprises an MPPT mechanism and a DC/DC converter, wherein said DC/DC converter, of said IC, converts only a part of said at least one string, connected to said IC, when said at least one string is impaired, for compensating for the relative voltage difference between the voltage of the MPP of said impaired string and the MPP voltage of said DC bus of said solar inverter.

BRIEF DESCRIPTION OF THE DRAWINGS

The accompanying drawings, and specific references to their details, are herein used, by way of example only, to illustratively describe some of the embodiments of the invention.

In the drawings.

DETAILED DESCRIPTION

Figure 1:
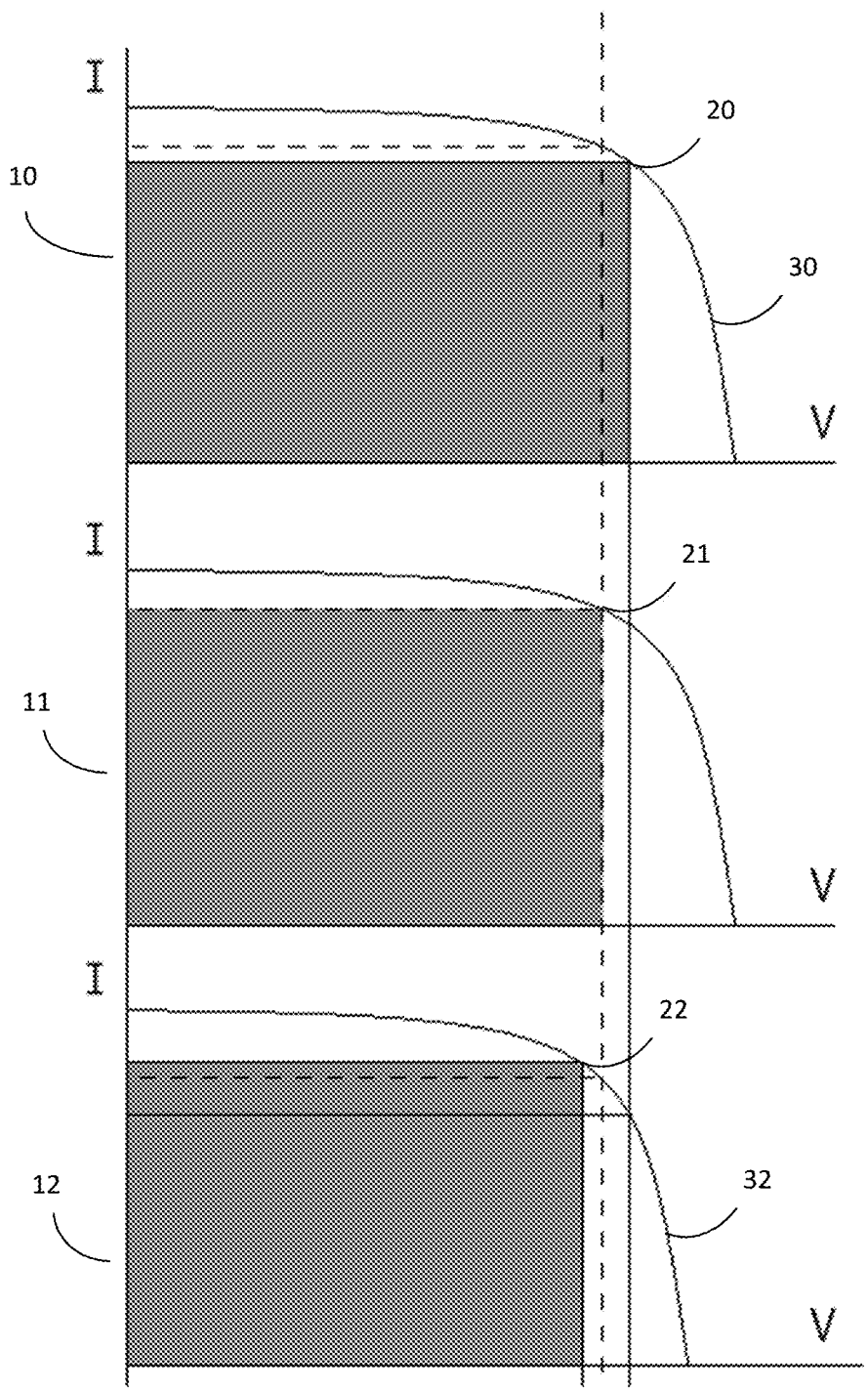
FIG. 1 is a diagram of 3 graphs, which exhibit the electrical Power production performances of strings, of solar panels, based on their I-V curve, i.e. voltage and current characteristics.

FIG. 1 is a diagram of 3 graphs which exhibit the electrical Power production performances of strings, of solar panels, based on their I-V curve, i.e. voltage and current characteristics. When a number of operable solar panels are connected in series, i.e. a string, their combined energy output typically acts as curve 30. When working in a voltage mode circuit, the consumed current, from the string, is fairly stable when the consumed voltage is raised until a certain point, after which the current drops rapidly when the voltage is raised, as shown by curve 30. Since the Power of the string equals to the current times voltage (P=I*V), the Maximum Power Point (MPP) of the string, on curve 30, is located at MPP 20. For the case of brevity, the area that symbolizes the maximum Power, generated by the string, is painted in gray. As shown, in graph 10, the maximum area of the gray rectangle, that is limited by the curve 30, is defined by the point 20 (X, Y) grid.

When part of the panels in a string are impaired, the impaired panels do not generate as much power as the other normally operating panels, and the I-V curve of the whole string changes, as depicted by curve 32 of FIG. 1. The net effect, then, is that the current, of the impaired string, typically drops at a different value and the impaired string has a different curve than the fully operational string. The MPP of the impaired string, depicted by curve 32, is located at point 22, which has different I-V values than the fully operational string which its power is depicted by curve 20. As shown, the gray rectangle of curve 32 is different in shape and area. The MPP 22 of curve 32 is at a lower voltage value than the MPP 20 of curve 30.

When at least one of the strings of the array is impaired, the average MPP of the strings is affected. In this case, the inverter, which contains the Maximum Power Point Tracking (MPPT) circuitry, adjusts the voltage (and the current) of the whole array to the average MPP of the strings. However, the average MPP 21, as depicted in graph 11 of FIG. 1, is far from the individual MPP's of each of the strings. The average MPP 21 is far from the impaired string MPP 22 and far from the fully operational string MPP 20. Thus, the inverter causes all the strings to operate away from their more efficient MPP.

Figure 2:
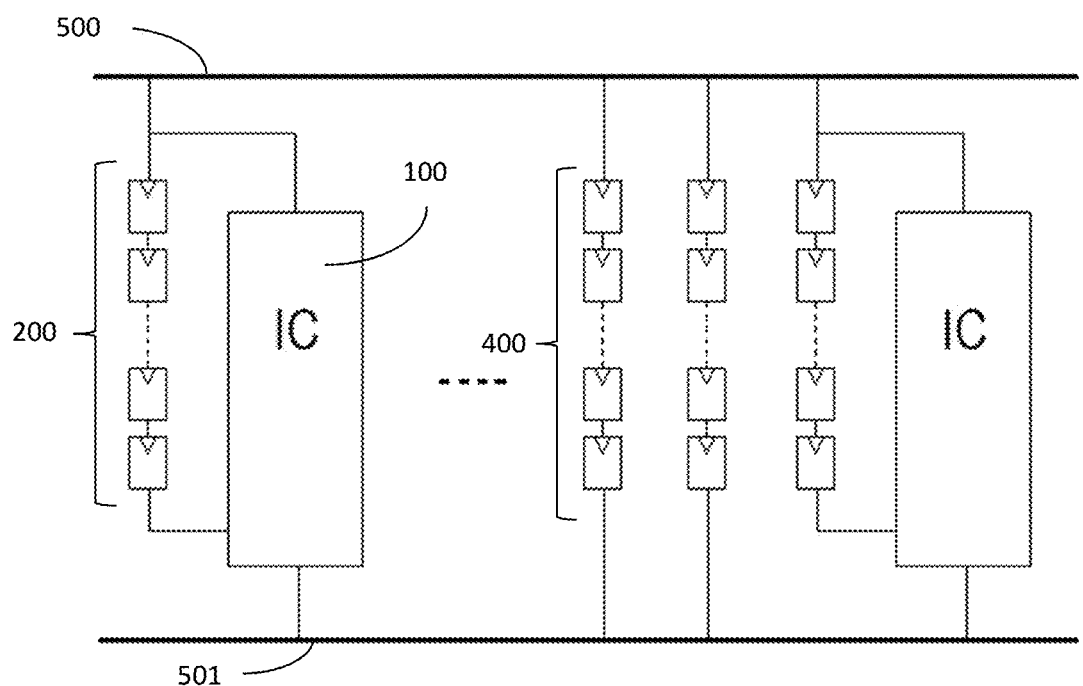
FIG. 2 is a schematic diagram depicting strings of solar panels connected in an array, with injection circuits, according to an embodiment.

FIG. 2 is a schematic diagram depicting strings of solar panels connected in an array, with injection circuits, according to an embodiment. A solar inverter (not shown), is connected, at its input, to the DC bus lines 500-501, for converting the solar DC power, from the array of strings, to AC power. In this embodiment, the Injection Circuit (IC), e.g. IC 100, is connected, at its input, to the string 200, wherein its output is connected to the DC bus lines 500-501 which are connected to the inverter (not shown) and the other strings of the array. The purpose of the Injection Circuit (IC) is to substitute the lost voltage, caused by the impaired panels of the connected string, using power conversion. By using power conversion techniques, part of the current of the connected string can be used to create more voltage, i.e. substitute the lost voltage, as will be described in greater detail in relations to FIG. 3. In one embodiment, the IC 100 may have an internal MPPT mechanism, for finding the MPP of the connected string 200. The IC 100 may also have a DC/DC converter, which will be described in relations to FIG. 4, for converting at least a part of the power of its connected string 200 for substituting the lost voltage, caused by the impaired panels of string 200. Thus, the IC 100 can compensate for a decrease in voltage, of its interconnected impaired string 200, to correspond with the voltage of the other fully operating strings. For example, if string 200 is impaired, the IC 100 can add to the voltage of the string 200, between the lines 500 and 501, as to compensate for the lost voltage from the impaired panels.

Thus, the overall voltage of the impaired string 200 and its IC 100 can be similar to the voltage of the fully operating string 400, for example.

In some of the embodiments each string has its own IC, thus, when the voltage of one of the strings drops, its IC can compensate the voltage drop by enhancing the voltage of the interconnected string on the expense of the string's current.

Figure 3:
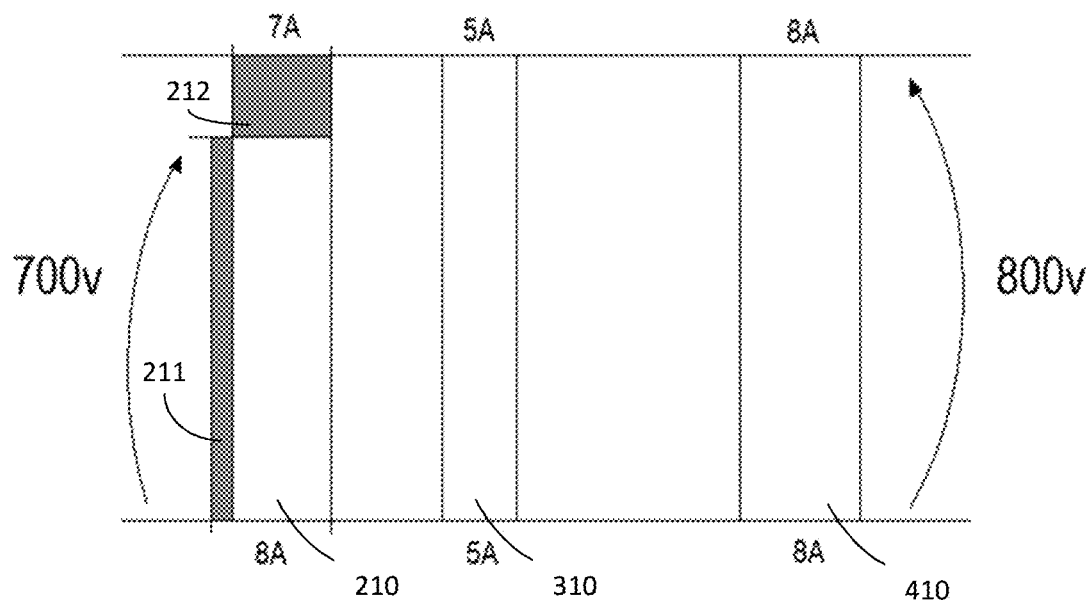
FIG. 3 is an exemplified graphical representation of the power production of a number of strings, each having an Injection Circuit (IC), according to an embodiment.

FIG. 3 is an exemplified graphical representation of the power production of a number of strings, each having an IC, according to an embodiment. In this example, a fully operational string is designed to produce the voltage of 800V and a current of 8 A, as depicted in graph 410. However, if the string is impaired, for example, and produces only 700V with the same current of 8 A, in its MPP, as depicted in graph 210, then the current may be converted into voltage, using power conversion methods, for example. In this example, of graph 210, 1 A of current and 700V is converted by the IC into 7 A of current and 100V. Thus, the power of the string stays 5600 W, however instead of producing 700V*8 A, the string produces now 800V*7 A. The graph 210 shows that the lower left gray rectangle 211 may be interchanged with the higher right gray triangle 212 both having the same area. For the case of brevity an example is shown, by graph 310, what would have happened if an IC would not be used and there would be no power conversation. In this example, the string would have been forced to work in in the average voltage that is estimated close to 800V (depends on the number of fully operational strings) and not at its MPP. In this example, the string would have produced only 5 A of 800V which would have been only 4000 W=800V*5 A, a loss of 1600 W. Thus, by using ICs, all the strings, impaired and fully operational, can have their MPP at the same voltage value without losing more power than necessary.

Figure 4:
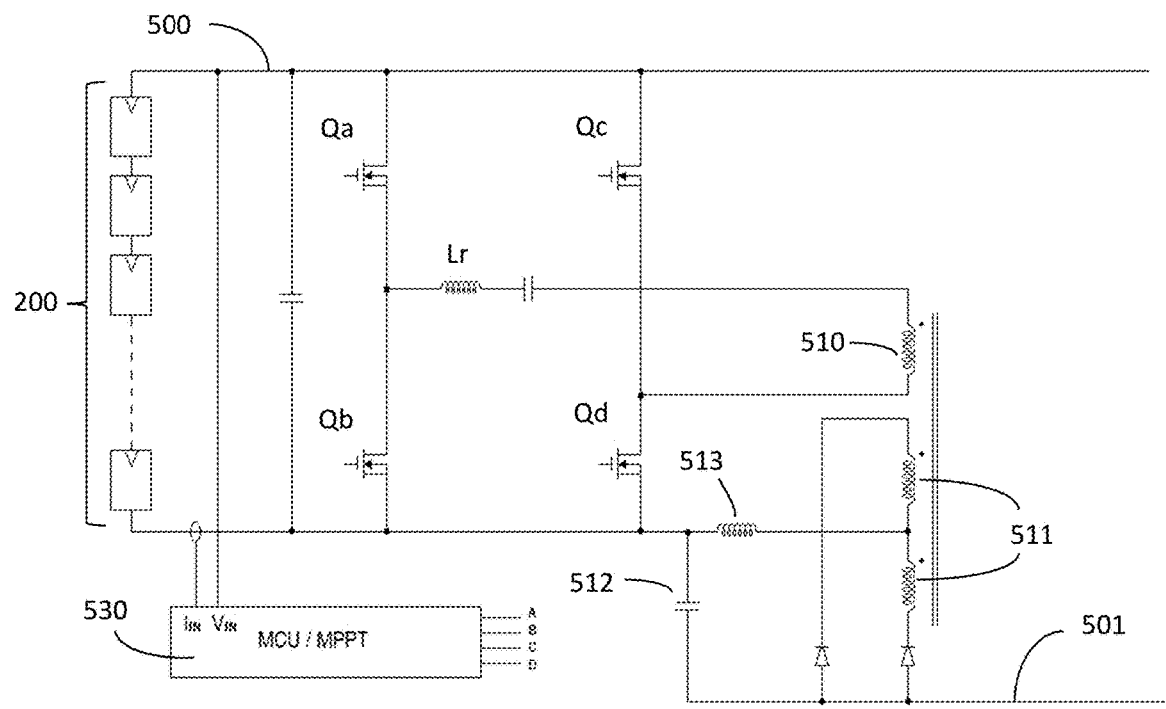
FIG. 4 is a schematic diagram of an exemplified IC, according to an embodiment.
Figure 5:
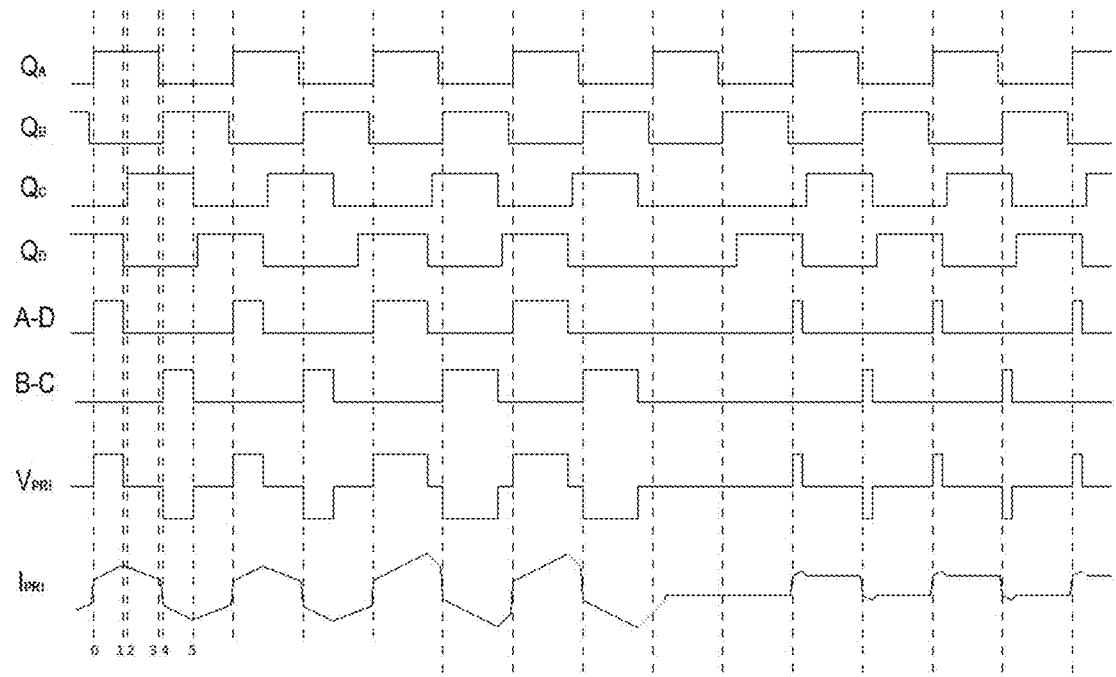
FIG. 5 depicts the graphs of the currents in the IC, according to an embodiment.

FIG. 4 is a schematic diagram of an exemplified IC, according to an embodiment. FIG. 5 depicts the graphs of the currents and voltages in the IC, according to an embodiment. As known in the art, there can be many electrical implementations for the IC, nevertheless, for the sake of enablement, an IC, e.g. a phase shift full bridge circuit, is explained as an embodiment, together with the graphs that depict its currents and voltages. As described above, in relations to FIG. 2, the IC may have a DC/DC converter, which converts part of the power of the connected string for compensating the lost voltage, which may be caused by the impaired panels, of the connected string. Thus, when the string 200 is impaired, the DC/DC converter, of the connected IC, can compensate for the relative voltage difference between the voltage MPP, of the impaired string 200, and the MPP voltage of the DC bus lines 500-501 of the array of strings.

For example, if the voltage of the string 200 drops, then the voltage between the lines 500 and 501 drops, and the lost voltage has to be compensated, as described above. Thus, at first, the MPPT circuit 530 may detect that the voltage of the string 200 dropped. At this stage the MOSFETs Qa and Qd are turned on where Qb and Qc are off. Thus, the current flows through Qa and Qd, delivering power to the primary coil 510 of the transformer. The primary coil 510 induces current in the secondary coils 511 which is transformed by capacitor 512 into voltage, effectively enhancing the voltage between the lines 500 and 501. The coil 513 regulates the current flow to the capacitor 512. When Qd is turned off, primary current flows through output capacitance of Qc and discharges it, thus, Load current now flows through the output rectifiers.

Time: $t(0) < t < t(1)$

The description below, of the Phase Shifted operation, begins with the conclusion of one power transfer cycle. This may occur when the transformer, e.g. 510-511, had been delivering power to the load 512 and two of diagonal switches of the converter are conducting. The initial current flowing in the primary is referred to as IPri(t(0)). Output voltage determined from Vout_max=Vin/N to Vout_min by changing phase shift that may increase freewheeling period on right and left legs (Active to Passive and Passive to Active legs) of the Full Bridge.

Time: $t(1) < t < t(2)$

The primary current flowing at time t(1) is equal to IPri(t(0)) and was being conducted through the diagonal set of transistors Qa in the upper left hand corner of the bridge and the transistor Qd in the lower right. Instantly, at time t(1) the switch Qd is turned off by the control circuitry which begins the resonant transition of the right hand leg of the converter. The primary current flowing is maintained nearly constant at IPri(t(0)) by the resonant inductance of the primary circuit, often referred to as the transformers leakage inductance. Since an external series inductance can be added to alter the effective leakage inductance value, this explanation will refer to the lumped sum of these inductors as the resonant inductance Lr, that may be located in series to coil 510. In a practical application it may be difficult to accurately control the transformers leakage inductance within an acceptable ZVS (Zero Voltage Switching) range, which necessitating an external "shim" inductor to control the accuracy. It's also possible that the transformer leakage inductance can be too low to provide the desired transition times for the application so an external inductor can be added to modify the resonant inductance.

With switch Qd turned off, the primary current continues to flow using the Qd switch output capacitance, Cd, to provide the path. This may charge the switch capacitance of Qd from essentially zero volts to the upper voltage rail, Vin+. Simultaneously, the transformer capacitance and the output capacitance of switch Qc is discharged, as its source voltage rises from the lower to the upper rail voltage. This resonant transition positions switch Qc with no drain to source voltage prior to turn-on and facilitates lossless, zero voltage switching. The primary current causing this right leg transition can be approximated by the full load primary current of IPri(t(0)). The small change due to the barely resonant circuit contribution may be negligible in comparison to the magnitude of the full load current.

During this right leg transition, the voltage across the transformers primary has decreased from VIN to zero. At some point in the transition the primary voltage drops below the reflected secondary voltage, VO×N. When this occurs the primary is no longer supplying full power to the secondary, and the output inductor voltage changes polarity. Simultaneously, energy stored in the output choke begins supplementing the decaying primary power until the primary contribution finally reaches zero. Once the right leg transition has been completed there is no voltage across the transformer primary 510. Likewise, there is no voltage across the transformers secondary winding 511 and no power transferred, assuming ideal conditions. The resonant transition not only defines the rate of change in primary and secondary voltages dV/dt, but also the rate of change in current in the output filter network, dI/dt.

Time: $t(2)<t<t(3)$

Once the right leg transition is complete, the primary current free wheels through transistor, i.e. switch, Qa and the body diode of switch Qc. The current would remain constant until the next transition occurs assuming that the components are ideal. Switch Qc can be turned on at this time which shunts the body diode with the FET Rds(on) switch impedance thus lowering conduction losses. Although current is flowing opposite to the normal convention (source to drain) the channel of Qc will conduct and divide the current between the switch and body diode.

Time: $t(3)<t<t(4)$

At time t(3) a residual current was flowing in the primary of the transformer which is slightly less than IPri(t(0)) due to losses. Switch Qc has been previously turned ON and switch Qa will now be turned OFF. The primary current will continue to flow but the path has changed to the output capacitance (Ca) of switch Qa instead of its channel. The direction of current flowing causes the drain to source voltage of switch Qa to increase and lowers its source from the upper to lower rail voltage. Just the opposite conditions have occurred to switch Qb which previously had the full input across its terminals. The resonant transition now aligns switch Qb with zero voltage across it, enabling lossless switching to occur. Primary current continues to flow and is clamped by the body diode of switch Qb, which is still OFF. This clamping into a short circuit is a necessary condition for fixed frequency, zero voltage switching. Once switch Qb is turned ON, the transformer primary is placed across the input supply rails since switch Qc is already ON and will begin to transfer power. Although zero voltage switching has already been established, turning switch Qb ON, the instant it reaches zero voltage, will cause variable frequency operation.

Time: $t(4)<t<t(5)$

This interval of the phase shifted cycle is basically identical to that of conventional square wave power conversion. Two diagonal switches are ON which applies the full input voltage across the transformer primary. Current rises at a rate determined by VIN and the series primary inductance, however, starts at a negative value as opposed to zero. The current will increase to a DC level equal to the output current divided by the turns ratio, IO/N. The two time variant contributors to primary current are the magnetizing current (IMAG) and the output inductor magnetizing contribution reflected to the primary. The exact switch ON time is a function of VIN, VO and N the transformer turns ratio, just as with conventional converters.

Time: $>t(5)$

One switching cycle is concluded at time t(5) when Qc the upper right hand corner switch is turned OFF. Current stops flowing in Qc's semiconductor channel but continues through the parasitic output capacitance, Cc of Qc. This increases the drain-to-source voltage from essentially zero to the full input supply voltage, VIN. The output capacitance of the lower switch in the right hand leg (Qd) is simultaneously discharged via the primary current. Transistor Qd is then optimally positioned for zero voltage switching with no drain-to-source voltage. The current during this interval is assumed to be constant, simplifying the analysis. In actuality, it is slightly resonant as mentioned in the left leg transition, but the amplitude may be negligible in comparison to the full load current. The power conversion interval is concluded at this point and an identical analysis occurs as for the opposite diagonal switch set which has thoroughly been described for the switch set Qa and Qd.

Figure 6:
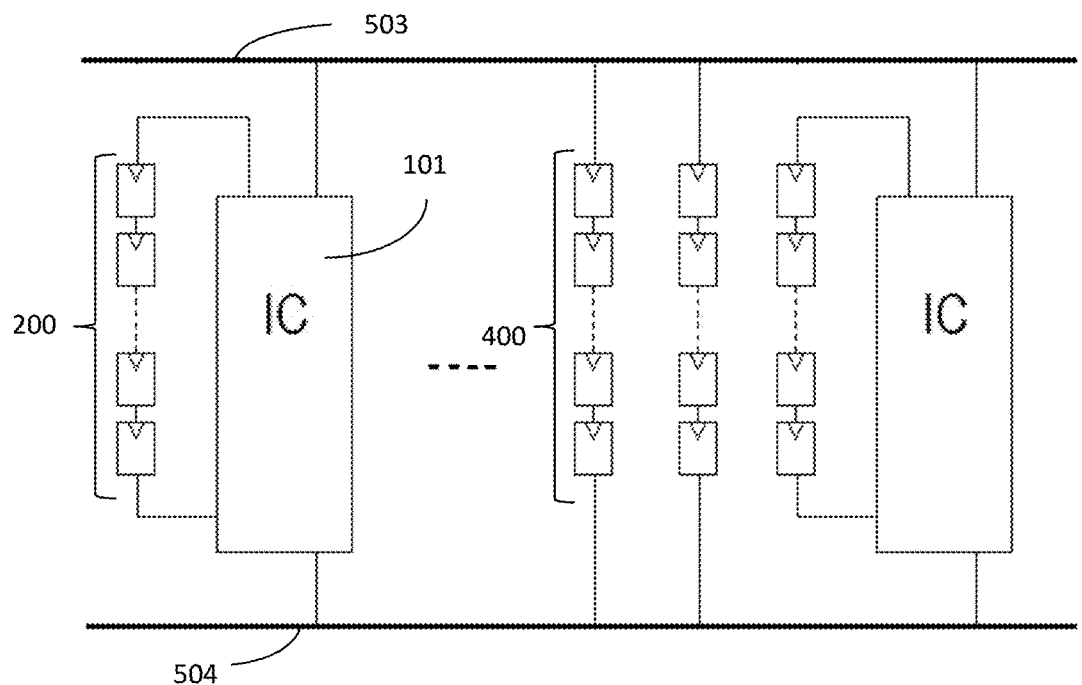
FIG. 6 is a schematic diagram depicting strings of solar panels connected in an array, with an injection circuits, according to another embodiment.

FIG. 6 is a schematic diagram depicting strings of solar panels connected in an array, with an injection circuits, according to another embodiment. Similar to the described in relation to FIG. 2, this diagram depicts strings of solar panels connected in an array, with injection circuits. However, in this diagram, the string 200 is connected only to the IC 101, which regulates its voltage, and supplies the bus lines 503-504 directly with the predefined voltage.

Figure 7:
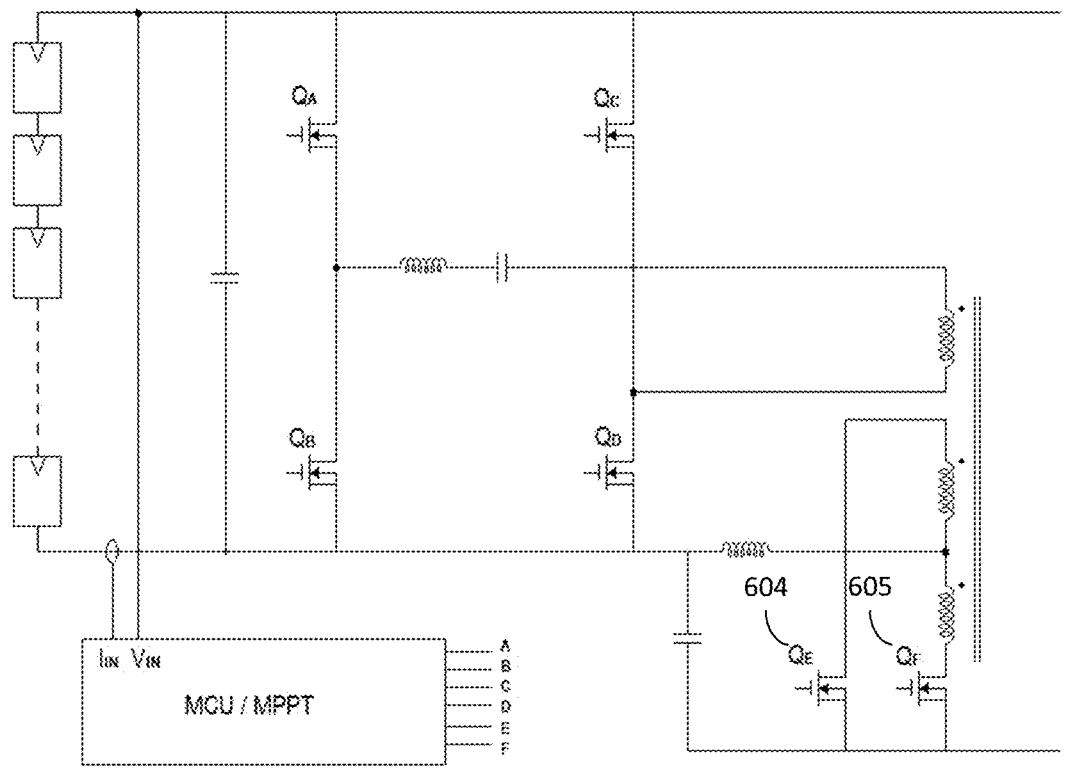
FIG. 7 is a schematic diagram of an exemplified IC, according to another embodiment.

FIG. 7 is a schematic diagram of an exemplified IC, according to another embodiment. Similar to the described in relation to FIG. 4, this diagram depicts an exemplified IC. However, in this diagram the bottom diodes are replaced by MOSFETS 604-605, otherwise known as synchronous rectification. In this embodiment the efficiency may be better since the power losses on the MOSFETS may be less than the power losses on the diodes.

Figure 8:
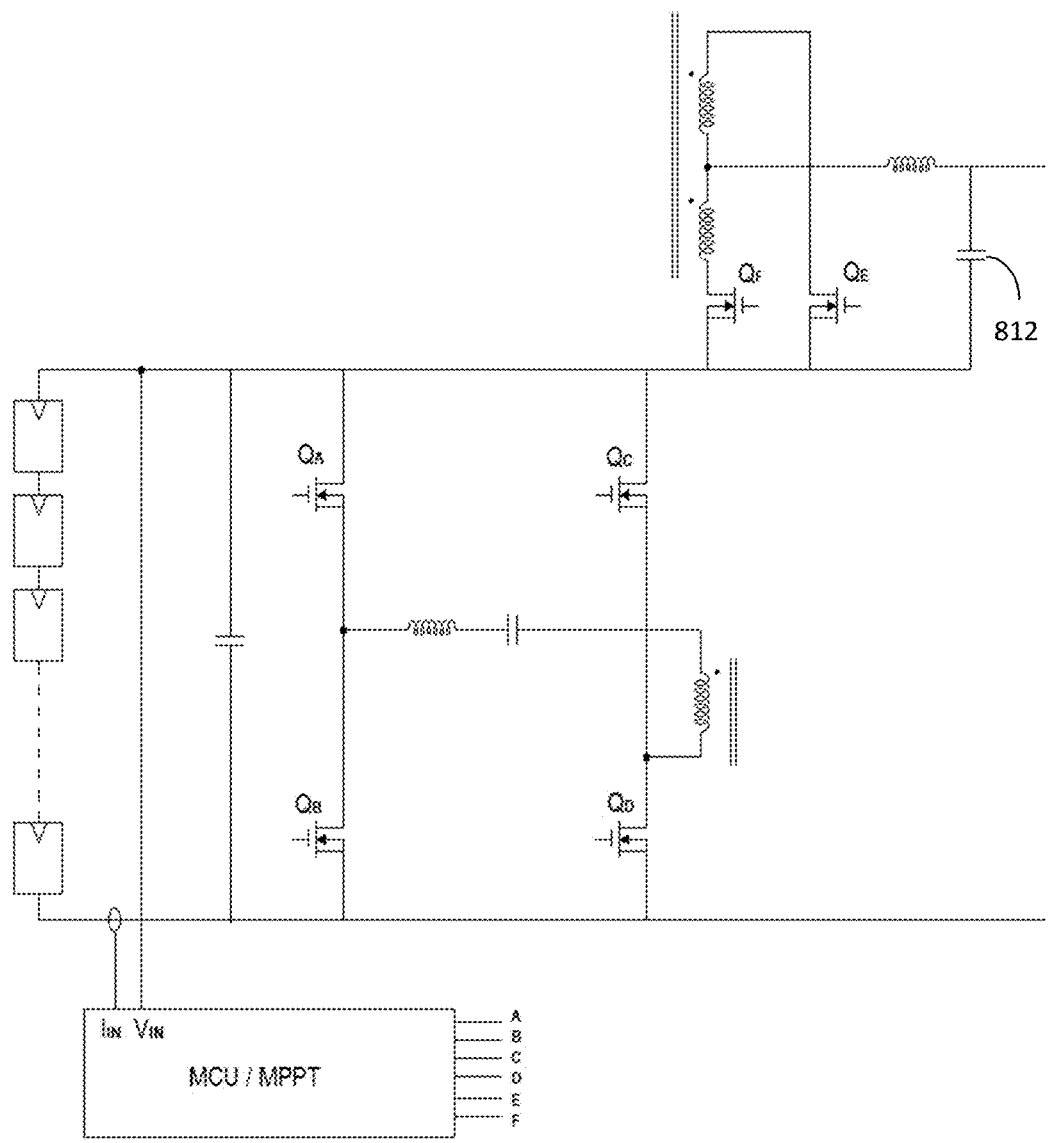
FIG. 8 is a schematic diagram of an exemplified IC, according to yet another embodiment.

FIG. 8 is a schematic diagram of an exemplified IC, according to another embodiment. Similar to the described in relation to FIG. 7, this diagram depicts an exemplified IC. However, in this diagram the current transformed by capacitor 812 into voltage, is a voltage which is added above the voltage of the connected string, effectively enhancing the voltage between the DC bus lines.

Figure 9:
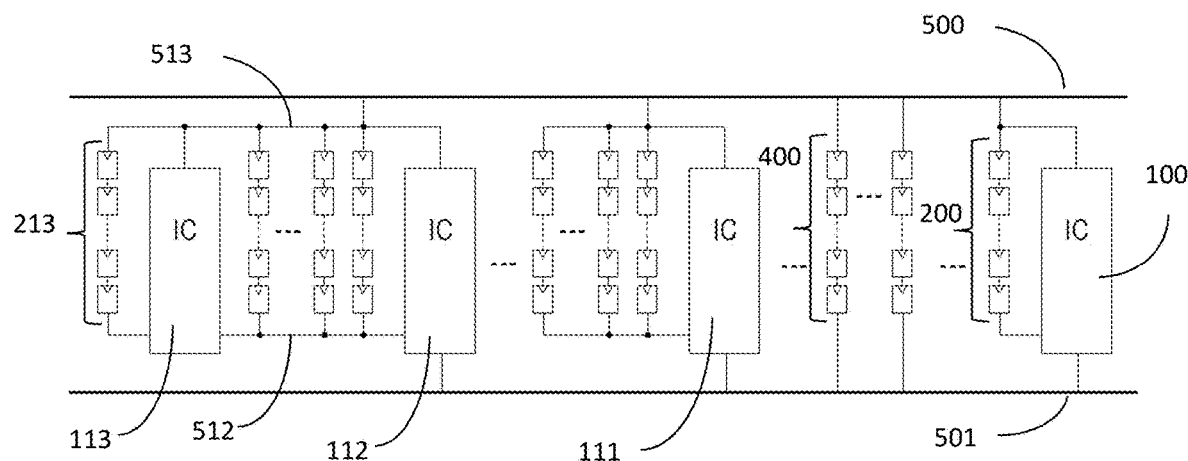
FIG. 9 is a schematic diagram depicting strings of solar panels with injection circuits, according to other embodiments.

FIG. 9 is a schematic diagram depicting strings of solar panels with injection circuits, according to other embodiments. Similar to the described in relation to FIG. 2, the IC 100 may be connected, at its input, to the string 200, wherein its output is connected to the DC bus lines 500-501 which are connected to the inverter (not shown) and the other strings of the array, such as string 400. The purpose of the IC 100 is to substitute the lost voltage, caused by the impaired panels of the connected string 200, using power conversion. By using power conversion techniques, part of the current of the connected string 200 can be used to create more voltage, i.e. substitute the lost voltage, thus, the IC 100 can compensate for a decrease in voltage, of its interconnected impaired string 200.

In one embodiment, the IC 111, of FIG. 9, may be connected, at its input, to a number of strings connected in parallel, e.g. combiner box, wherein its output is connected to the DC bus lines 500-501. Thus, the IC 111 may substitute the lost voltage, caused by the impaired panels of its connected strings, using power conversion techniques. For example, if a number of strings each have a number of impaired panels, they may be connected together, in parallel, to an IC, such as IC 111, where the IC 111 may convert part of the current of the connected strings voltage, i.e. substitute the lost voltage, for compensating for a decrease in voltage, of its interconnected impaired strings. In some cases, a number of strings may be connected together, in parallel, to an IC, such as IC 111, in a local MPP areas combined in to combiner box, which may be located far from inverter, where the IC 111 may convert part of the current of the connected strings voltage for compensating for a decrease in the voltage of the connected strings.

In one embodiment, the IC 112, of FIG. 9, may be connected, at its input, to a number of strings, connected in parallel, and to another IC 113 which its input is connected to another string 213. In this embodiment the IC 113 may be connected, at its input, to the string 213, wherein its output is connected to the lines 512-513 which are connected to the IC 112 and the other strings of the array. The purpose of the IC 113 is to substitute the lost voltage, caused by the impaired panels of its connected string 213. Thus, the IC 113 can compensate for a decrease in voltage, of its interconnected impaired string 213, to correspond with the voltage of the other parallel connected strings. On the other hand, the IC 112, which its output is connected to the DC bus lines 500-501, may be used for substituting the lost voltage, caused by the impaired panels of its connected parallel strings, thus, the IC 112 can compensate for a decrease in voltage, of its interconnected impaired strings. This cascading may be continued according to the needs of the implemented system and are all included in the scope of the invention.

Figure 10:
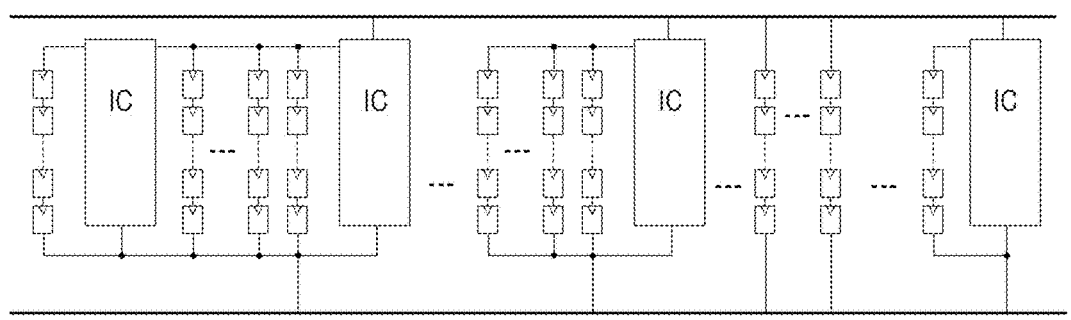
FIG. 10 is a schematic diagram depicting strings of solar panels with injection circuits, according to more embodiments.

FIG. 10 is a schematic diagram depicting strings of solar panels with injection circuits, according to more embodiments. Similar to the described in relation to FIG. 9, this diagram depicts ICs and strings with different interconnections. However, in this diagram voltage that is added by the ICs, is a voltage which is added above the voltage of the connected string.

Figure 11:
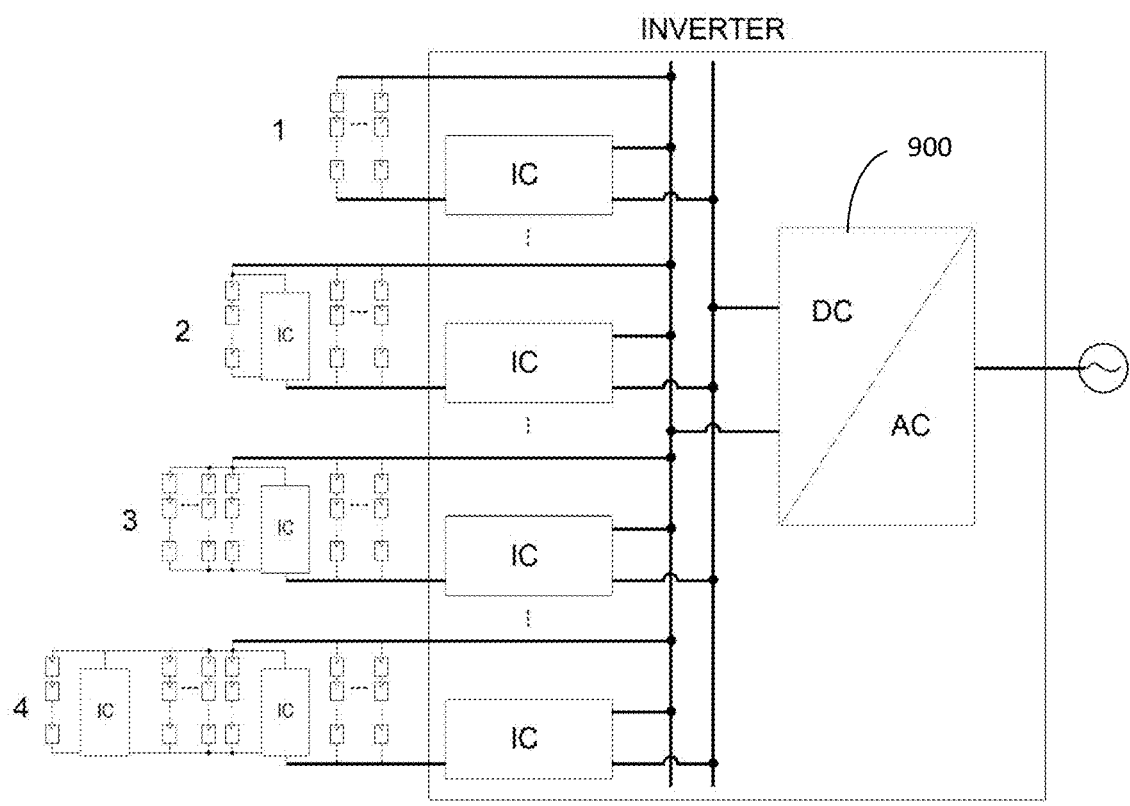
FIG. 11 is a schematic diagram depicting strings of solar panels with injection circuits, according to even more embodiments.

FIG. 11 is a schematic diagram depicting strings of solar panels with injection circuits, according to even more embodiments. Similar to the described, in relation to FIG. 9, this diagram depicts ICs and strings with different interconnections. However, in this diagram the ICs may be implemented close to the Inverter 900. In some embodiments the ICs may be added in the drawers of the inverter 900. Thus, the depicted ICs may each substitute the lost voltage, caused by the impaired panels of its connected string(s). Thus, the ICs can compensate, alone or together, for a decrease in voltage, of their interconnected impaired strings.

The solutions described above may have a better efficiency when dealing with a small percentage of impaired cells. For example, embodiments of the invention may be used for solar strings having less than 10% of impaired panels. This is partially due to the fact than in this case the string may require a very short pulse having a very large power for compensating the small voltage shortage from the impaired cells. Furthermore, since the solutions described above can work even when less than 10% of the cells are impaired, the solutions may work for systems having a dynamic range. Furthermore, since the embodiments described above compensate only the loss of voltage by using relative currency power, the proposed systems may use relatively smaller components which require less cooling.

In one embodiment, the operation dynamic range of the input of the string optimizer is between 250V-850V. In another embodiment, the operation dynamic range of the input of the string optimizer is between 400V-1400V. In another embodiment, the operation dynamic range of the input of the string optimizer is between 250V-1400V.

In one embodiment, the operation dynamic range of the delta output of the string optimizer is between 5V-250V. The term "delta output" is meant to include the output voltage of the IC, which is the DC bus voltage minus the connected string's voltage. In another embodiment the operation dynamic range of the output of the string optimizer is between 5V-150V. In another embodiment the operation dynamic range of the output of the string optimizer is between 10V-150V.

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. An optimizer for a solar string power generation system comprising:
    an array of strings of solar panels where at least a part of said solar panels are connected in series in said strings, and wherein said strings are connected in parallel to form said array of strings of solar panels;
    a DC bus, connected to said array of strings;
    an inverter, connected, at its input, to said DC bus, for converting a solar DC power, from said array of strings, to an AC power;
    at least one Injection Circuit (IC), connected at an input thereof, to at least one string of said strings and also connected, at its input, to another IC which its input is connected to at least one more string comprising:
        an MPPT mechanism, for finding the MPP of said connected at least one string;
        a DC/DC converter, for converting at least a part of a power of said connected at least one string; and
    wherein said DC/DC converter, of said IC, converts, using a power conversion, part of the power of said connected at least one string, for compensating for a relative voltage difference between a MPP voltage, of said connected at least one string, and a voltage of said DC bus thereby compensating for a decrease in voltage, of said connected at least one string, to correspond with a voltage of said DC bus, on an expense of a current of said connected at least one string.

2. The optimizer according to claim 1, where the IC is a phase shift full bridge circuit.

3. The optimizer according to claim 2, where the phase shift full bridge circuit has bottom diodes.

4. The optimizer according to claim 2, where the phase shift full bridge circuit has bottom synchronous MOSFETS.

5. The optimizer according to claim 1, where the operation dynamic range of the input of said string optimizer is between 250V-1400V.

6. The optimizer according to claim 1, where the operation dynamic range of the output voltage of the IC of said optimizer is between 5V-250V.

7. The optimizer according to claim 1, where the compensated voltage is added under the voltage of the connected at least one string.

8. The optimizer according to claim 1, where the compensated voltage is added above the voltage of the connected at least one string.

9. The optimizer according to claim 1, where the IC is implemented close to the inverter.

10. A method for optimizing a solar string power generation system, the method comprising:
- providing an array of strings of solar panels where at least a part of said solar panels are connected in series in said strings, and wherein said strings are connected in parallel to form said array of strings of solar panels; and
- providing an inverter, connected by a DC bus to said array of strings, for converting a solar DC power, from said array of strings, to an AC power;
- providing an Injection Circuit (IC), connected at an input thereof to at least one string of said strings and also connected, at its input, to another IC which its input is connected to at least one additional string, wherein said IC comprises an MPPT mechanism and a DC/DC converter; and
- converting, using a power conversion, part of the power of said connected at least one string, for compensating for a relative voltage difference between a MPP voltage, of said connected at least one string, and a voltage of said DC bus thereby compensating for a decrease in voltage, of said connected at least one string, to correspond with a voltage of said DC bus, on an expense of a current of said connected at least one string.

11. The method according to claim 10, where the IC comprises a phase shift full bridge circuit.

12. The method according to claim 11, where the phase shift full bridge circuit has bottom diodes.

13. The optimizer according to claim 11, where the phase shift full bridge circuit has bottom synchronous MOSFETS.

14. The method according to claim 10, where the operation dynamic range of the output voltage of the IC is between 5V-250V.

15. The method according to claim 10, where the compensated voltage is added under the voltage of the connected at least one string.

16. The method according to claim 10, where the compensated voltage is added above the voltage of the connected at least one string.

17. The method according to claim 10, where the IC is implemented close to the inverter.

* * * * *